April 22, 1952  A. DUERKSEN  2,593,547
MATRIX FOR TIRE TREADS WITH LATERAL TRACTION SLITS
Filed July 16, 1948  2 SHEETS—SHEET 1

INVENTOR.
Arnold Duerksen
BY
ATTYS

April 22, 1952  A. DUERKSEN  2,593,547
MATRIX FOR TIRE TREADS WITH LATERAL TRACTION SLITS
Filed July 16, 1948  2 SHEETS—SHEET 2

INVENTOR.
Arnold Duerksen
BY
ATTYS

Patented Apr. 22, 1952

2,593,547

UNITED STATES PATENT OFFICE 2,593,547

MATRIX FOR TIRE TREADS WITH LATERAL TRACTION SLITS

Arnold Duerksen, Lodi, Calif., assignor to Super Mold Corporation of California, Lodi, Calif., a corporation of California Application July 16, 1948, Serial No. 39,156

2 Claims. (Cl. 22—116)

This invention relates in general to a tire tread matrix; the matrix being especially designed, but not limited, for use in connection with the application of new treads to used tires by the process known in the trade as recapping.

Modern motor vehicle tires are formed in many instances with slits which extend laterally into the tread from the tire tread design grooves; such slits being to increase traction or road grip, and also are provided to ornament or enhance the appearance of the tread.

One object of the present invention is to provide a novel tire treading matrix which includes elements thereon to form the aforesaid traction slits in the tire treads shaped by said matrix.

Another object of the invention is to provide a tire treading matrix, as above, in which the traction slit forming elements are outwardly projecting, sheet metal inserts, known as sipes, fixed in connection with the matrix and extending laterally from the tread groove forming ribs of the matrix design.

An additional object of the invention is to provide a tire treading matrix, as in preceding paragraphs, wherein the sheet metal inserts, for forming the traction slits, are fixed to the matrix during the die casting of the tread groove forming ribs thereon; this being accomplished by a novel method which includes the use of a unique holder, for each sheet metal insert, mounted on the die block of the die casting machine.

A further object of the invention is to provide a practical and reliable tire tread matrix with lateral traction slit forming elements thereon, and a matrix which will be exceedingly effective for the purpose for which it is designed.

These objects are accomplished by means of such structure and relative arrangement of parts as will fully appear by a perusal of the following specification and claims.

Figure 1:
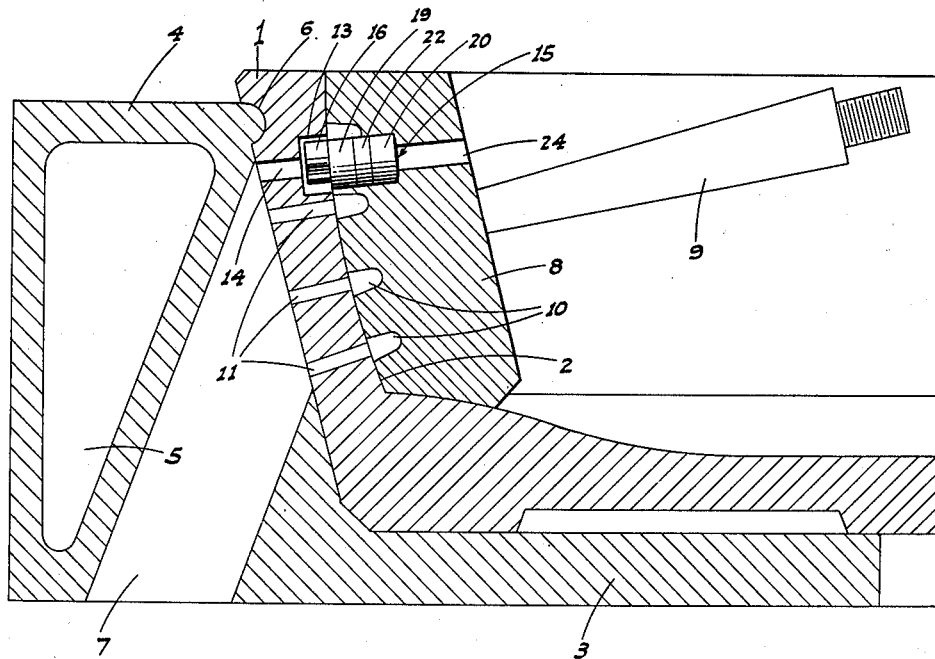
Fig. 1 is a fragmentary radial section of a matrix blank in a die casting machine preparatory to casting tread groove forming ribs on the working face of said blank, and illustrating particularly the mounting and use of the holder for one of the sheet metal inserts which is to be fixed to said matrix.
Figure 2:
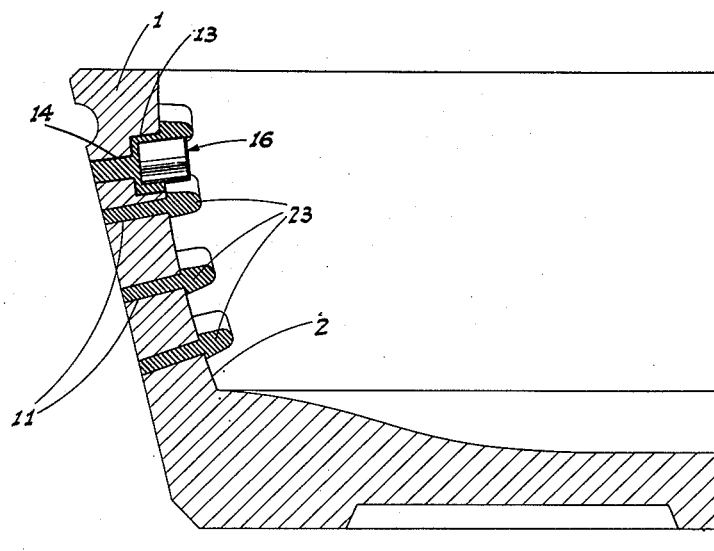
Fig. 2 is a fragmentary radial section of the completed matrix, showing one of the sheet metal inserts as fixed thereto.
Figure 3:
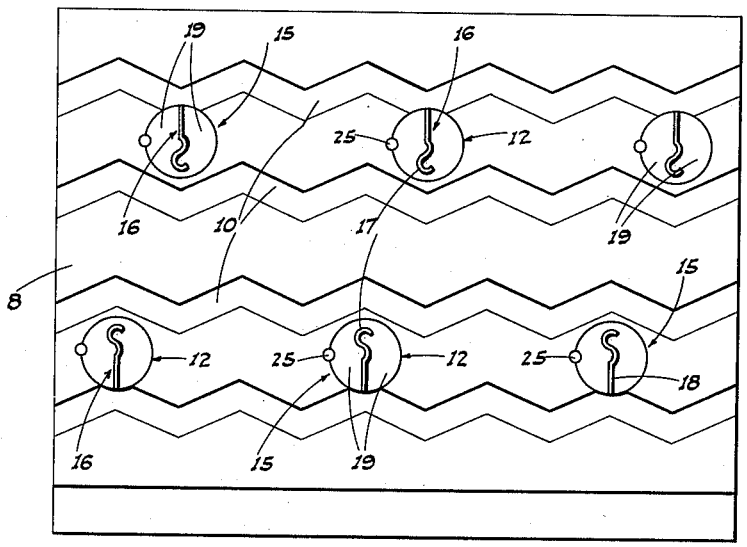
Fig. 3 is a fragmentary elevation of the working face of the die block, showing a number of the sheet metal inserts and their holders.
Figure 4:
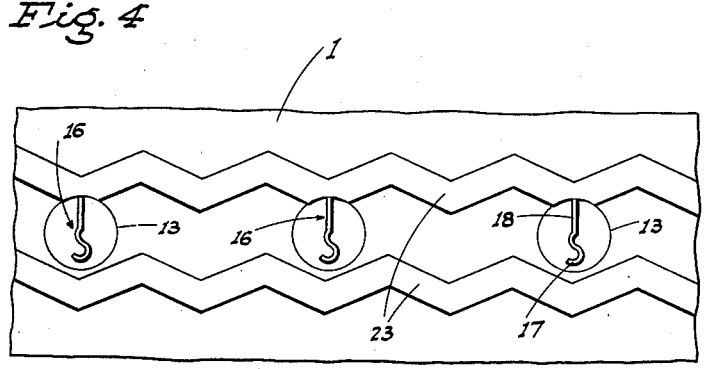
Fig. 4 is a fragmentary elevation of the working face of the matrix showing a number of the sheet metal inserts as transferred to said matrix from the die block.
Figure 5:
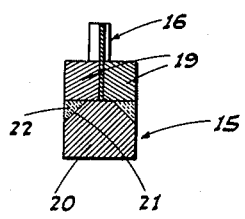
Fig. 5 is a cross section of a detached one of the holders including an insert therein.

Referring now more particularly to the characters of reference on the drawings, the improved tire treading matrix, including the sheet metal inserts thereon in association with the tread groove forming ribs of the matrix design, is comprised of an annular matrix blank, indicated generally at 1.

The tread design is die cast onto the working face 2 of the matrix blank 1 by means of a machine and a method as shown particularly in co-pending application, Serial No. 708,111, filed November 6, 1946, now Patent 2,478,657 issued August 9, 1949. Such die casting machine includes a horizontal platform 3 on which the annular matrix blank 1 rests with its axis vertical; said platform 3 adjacent its periphery including an upstanding back wall 4 having a heating chamber 5 therein, and the matrix blank 1 abuts and seals with said wall, as at 6.

A fluid metal feed passage 7 leads upwardly through the platform 3 and back wall 4 to communication with the periphery or outer surface of the annular matrix blank 1; fluid die casting metal being supplied to the passage 7 by a melting pot (not shown).

A segmental die block 8 is disposed within the annular matrix blank 1 and includes an arcuate working face which matchingly engages the working face 2 of said matrix blank.

The segmental die block 8 is maintained in place by a mounting structure including a holding shank 9.

The die casting of the matrix design on the working face 2 of the annular matrix blank 1 is carried out section by section; said blank 1 being moved ahead step by step for this purpose in the same manner as contemplated in the identified copending application.

The segmental die block 8 is formed with matrix design grooves 10, which open to the working face of said die block, and ducts 11, corresponding to said groove 10, extend through the annular matrix blank 1 in communication between the fluid metal feed 7 and such grooves.

Additionally, the segmental die block 8 includes a plurality of circular bores 12 opening to the working face of said die block each in register with a corresponding but relatively enlarged circular bore 13 in the annular matrix blank 1 opening to its working face 2.

Each circular bore 12 in the die block 8 opens on one side in communication with an adjacent one of the grooves 10; the latter having direct communication with the corresponding circular bore 13 in the matrix blank 1 by reason of the relative enlargement or over-size of said bore 13. The bottom of each circular bore 13 is in communication with the fluid metal feed passage 7 by means of a duct 14.

A holder 15, in the form of a plug, fits in matching relation in each of the circular bores 12; such holder being flush with the working face of the die block 8 and supporting a web-like, sheet metal insert or sipe 16, with approximately one-half of the length of the latter projecting, in clearance relation, all about, into the corresponding circular bore 13.

Each of the inserts or sipes 16 is of relatively thin sheet metal having a predetermined longitudinal configuration previously imparted thereto, as by stamping. In the present instance each sheet metal insert comprises, in end view, a generally S-portion 17 and a straight web portion 18.

To facilitate the initial mounting of each sheet metal insert 16 in its plug-like holder 15, the latter comprises a pair of half sections 19 matching the insert 16 on opposite sides from one end to substantially its center point; said half sections 19, when engaged with the corresponding insert 16, being circular at the periphery. A circular body 20 abuts the pair of half sections 19 at their outer ends, and said body, at its inner end, is chamfered, as at 21, to permit of the welding, as at 22, of the body 20 to the pair of half sections 19, whereby each holder 15 is a unitary cylindrical plug with the corresponding insert 16 projecting approximately half its length from one end of said plug.

With a plug-like holder 15 in each of the circular bores 12, the die block 8 is brought to its working position in matching engagement with the working face 2 of the annular matrix blank 1 in the manner illustrated in Fig. 1. At this time the free or projecting end of each sheet metal insert 16 is disposed in clearance relation in the corresponding circular bore 13 of said matrix blank. Thereafter, fluid metal is introduced, under pressure, into the feed passage 7 and through the ducts 11 and 14, filling the matrix design grooves 10, as well as the circular bores 13, with metal; the metal cast into each circular bore 13 having connection with the metal cast into the adjacent and corresponding groove 10.

After the above described casting operation, and when the cast metal is hardened, the annular matrix blank 1 is removed from the platform 3, and the die block 8 is removed from said matrix blank. This leaves, upon the working face 2 of the matrix blank 1, the tread groove forming ribs 23 of the matrix design, together with the sheet metal inserts 16 embedded at their initially free half in the metal cast into the circular bores 13; the opposite half of each sheet metal insert 16 then projecting outward from the working face 2 in the same direction as the ribs 23 and laterally from one thereof. Such outwardly projecting half of each sheet metal insert 16 initially is surrounded, upon removal of the die block 8, by its plug-like holder 15, but which holder is readily driven or slipped off of said insert.

If any difficulty is encountered, in freeing each plug-like holder 15 from its circular bore 12 of the die block 8, a drive-out rod (not shown) is inserted through a reduced-diameter bore 24 which extends from the bottom of each circular bore 12 rearwardly to communication with the back face of said die block.

In the above manner a tire treading matrix can be constructed, in a practical manner, with sheet metal inserts fixed in the matrix and projecting outwardly from the working face thereof in the same direction as the tread groove forming ribs 23, with such sheet metal inserts extending laterally from a corresponding one of such ribs. Thus, when the described matrix is employed in a vulcanizing machine to shape a tread upon a tire, as in recapping, the ribs 23 form the tread grooves, while the sheet metal inserts 16 form the traction slits which extend laterally from certain of said grooves, with said slits of the same depth and in communication with such grooves.

The holders 15 are maintained in proper position in the circular bores 12 by small taper plugs 25, and in correct position the sheet metal inserts are disposed so that the straight web portions 18 thereof are adjacent and lead in transverse relation to the corresponding groove 10.

As the bores 12 each open on one side to a groove 10, the adjacent edge of each insert, which extends to the periphery of its holder, merges with the adjacent and corresponding rib on the completed matrix.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In the manufacture of a tire tread matrix, a circumferential matrix blank having an inner working face and a bore open to said face, a die block having a working face to matchingly engage the matrix blank face in located but non-attached relation thereto, said block having a bore in from its working face to match the bore in the matrix blank, a plug-like holder removably seated in the block bore so as to be flush with the working face of the block, a longitudinally straight traction-slit element, one end portion of which is slidably projected into the holder in engaged but releasable relation upon relative end-to-end movement of the element and holder, and the other end portion of the element projecting from the flush face of the holder and into the bore in the matrix blank; there being means to feed molten metal into the blank bore to surround and embed the projecting portion of the insert element.

2. In the manufacture of a tire tread matrix, as in claim 1, wherein the die block is formed with a reduced-diameter bore, between said holder receiving bore and the back of said die block, for the reception of a holder drive-out tool.

ARNOLD DUERKSEN.

REFERENCES CITED

The following references are of record in the file of this patent:

UNITED STATES PATENTS

| Number | Name | Date |
|---|---|---|
| 1,298,176 | Chadwick | Mar. 25, 1919 |
| 1,484,429 | Thompson | Feb. 19, 1924 |
| 1,911,040 | Schultz | May 23, 1933 |
| 1,925,400 | Nelson | Sept. 5, 1933 |
| 2,224,337 | Bostwick | Dec. 10, 1940 |
| 2,253,771 | Dulaney | Aug. 26, 1941 |
| 2,263,001 | Gunsoulus | Nov. 18, 1941 |
| 2,275,582 | Bull | Mar. 10, 1942 |
| 2,332,856 | Kalajian | Oct. 26, 1943 |
| 2,339,696 | Hawkinson | Jan. 18, 1944 |
| 2,382,200 | Brunner | Aug. 14, 1945 |
| 2,421,454 | Doering | June 3, 1947 |
| 2,440,321 | Bacon, Jr. | Apr. 27, 1948 |
| 2,478,657 | Glynn | Aug. 9, 1949 |
| 2,480,966 | Richardson | Sept. 6, 1949 |